(12) United States Patent
Schmidt et al.

(10) Patent No.: US 6,322,275 B1
(45) Date of Patent: Nov. 27, 2001

(54) DEVICE FOR MOUNTING A DISTANCE SENSOR ON A MOTOR VEHICLE

(75) Inventors: Ewald Schmidt, Ludwigsburg; Juergen Zeiher, Stuttgart; Bernhard Lucas, Mundelsheim; Dirk Langenhan, Schwieberdingen, all of (DE)

(73) Assignee: Robert Bosch GmbH, Stuttgart (DE)

( * ) Notice: Subject to any disclaimer, the term of this patent is extended or adjusted under 35 U.S.C. 154(b) by 0 days.

(21) Appl. No.: 09/297,796
(22) PCT Filed: Jul. 8, 1998
(86) PCT No.: PCT/DE98/01877
§ 371 Date: Jul. 8, 1999
§ 102(e) Date: Jul. 8, 1999
(87) PCT Pub. No.: WO99/13525
PCT Pub. Date: Mar. 18, 1999

(30) Foreign Application Priority Data

Sep. 8, 1997 (DE) .............................. 197 39 298

(51) Int. Cl.⁷ ...................................................... F16C 11/00
(52) U.S. Cl. .................................. 403/14; 403/24; 403/77
(58) Field of Search .................................. 403/76, 77, 53, 403/54, 56, 90, 122, 119, 24, 13–14; 411/399, 402; 342/70

(56) References Cited

U.S. PATENT DOCUMENTS

| | | | |
|---|---|---|---|
| 5,113,330 | * | 5/1992 | Makita .................................. 362/265 |
| 5,743,618 | * | 4/1998 | Fujino et al. .......................... 362/61 |
| 5,926,127 | * | 7/1999 | Schmidt et al. ....................... 342/70 |

FOREIGN PATENT DOCUMENTS

| | | |
|---|---|---|
| 42 01 214 | 2/1993 | (DE) . |
| 196 42 810 | 4/1998 | (DE) . |
| 05 027037 | 2/1993 | (JP) . |
| WO 97 48578 | 12/1997 | (WO) . |

* cited by examiner

Primary Examiner—Harry C. Kim
(74) Attorney, Agent, or Firm—Kenyon & Kenyon

(57) ABSTRACT

A device for mounting a distance sensor, in particular a proximity radar device, on a motor vehicle, the distance sensor being accommodated in a closed housing, the housing being moveably attached to a support and the support being attachable in an immoveable manner to the motor vehicle. The device is characterized in that the housing is attachable to the support by at least three screws arranged in an L-shape relative to each other, that the screws, in the installed state of the distance sensor, are able to be screwed from its front side, and that a screw-out protection is provided for at least two of the screws.

10 Claims, 3 Drawing Sheets

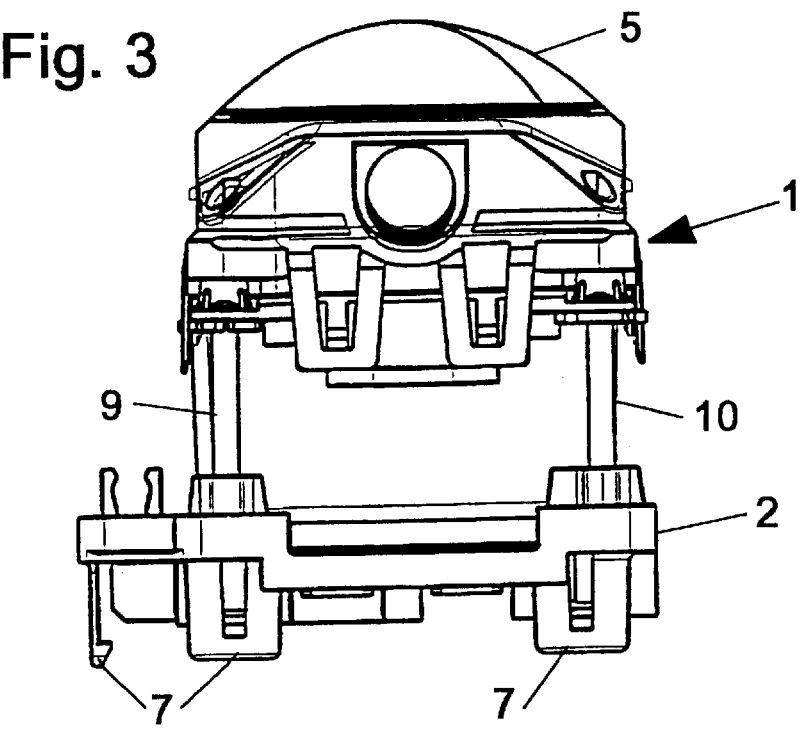
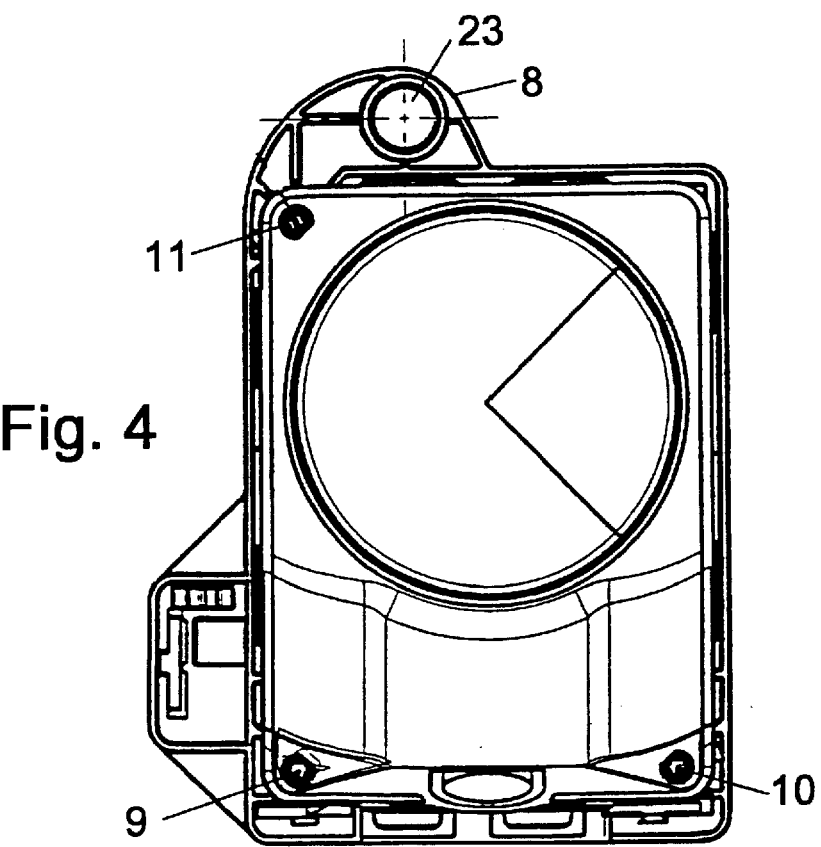

DEVICE FOR MOUNTING A DISTANCE SENSOR ON A MOTOR VEHICLE

FIELD OF THE INVENTION

The present invention relates to a device for mounting a distance sensor, in particular a proximity radar device, on a motor vehicle The device simultaneously permits simple shifting of the alignment (adjustment) of the distance sensor, for example, in relation to the longitudinal axis of the vehicle, free from operator error.

BACKGROUND INFORMATION

A device of this type is known from German Patent No. 42 01 214. This patent describes a device for adjusting a directional antenna of an anti-collision radar device of a motor vehicle, in which the alignment of the directional antenna is adjustable with the aid of an adjustment headlight. At the same time, a device is disclosed here for mounting the anti-collision radar device on the motor vehicle. In this device, the directional antenna of the anti-collision radar device is connected via a rotary axle to a vehicle-mounted housing. This design only permits adjustment of the directional antenna in the direction of height. The adjustment can be carried out with the assistance of an adjusting plate, both using adjusting screws and using a positioning motor. According to the patent, it is left to the discretion of one skilled in the art to provide a mounting support which would permit adjustability in two or even in all three directions. However, the patent gives no teaching of the kind which must be taken into consideration in such a mounting support with regard to cost-effective, large-scale production, easy applicability on other motor vehicles, as well as fast mounting and adjustment, free from operator error. Accordingly, the patent also gives no information about how a mounting support could look, in view of these additional requirements.

From German Patent No. 196 42 810.6–53, which is not pre-published, it is known that the type of mounting support for a radar system, or at least of its directional antenna, can be adapted from the known suspension mount or support of a motor-vehicle headlight. In this context, the radar system or its directional antenna is fixed in position at three points, preferably in an L-shape relative to each other, in one plane vertical to the main beam direction. Thus, the two outer suspension mounts are displaced in two directions relative to each other. They are composed in each case of a threaded rod which is provided at one end with a ball pivot and is moveably supported by this in a mounting support. The middle, third suspension point is likewise moveably supported by a ball pivot, however, it generally has no adjustment possibility in the form of a threaded rod or something similar. The patent points out the problem that in each case, the adjustment device must be re-adapted to different installation surroundings. To that end, it suggests a radar system in which, to adjust the main beam direction, the position of the transmitter/receiver elements of the radar system is variable relative to a focusing means. However, such a radar system requires a design already basically suited to that, permitting, for example, adjustability of the transmitter/receiver elements within a housing of the distance sensor. The teaching of this patent cannot easily be transferred to a radar system already constructed per se, that does not include such adjustability. Furthermore, German Patent No. 196 42 810.6–35 does not disclose a device for mounting the distance sensor on the motor vehicle itself.

Object, Achievement and Advantages of the Invention

SUMMARY OF THE INVENTION

The object of the present invention is to specify an alternative device for mounting a distance sensor on a motor vehicle.

The advantage of the present invention compared to a radar system according to German Patent No. 196 42 810.6–35 is that the basic design of a distance sensor can remain unchanged within its housing. In this respect, the present invention requires no basic redesign of already existing distance sensors. Because the distance sensor is mounted on a motor vehicle by way of a separate holder, only a change of this holder is necessary for applying the distance sensor on other motor vehicles. The distance sensor itself can be used substantially unchanged for different types of motor vehicles. Thus, the combination of all the features of the invention ensure a simple adjustment and a simple application of the distance sensor on a motor vehicle. Compared to German Patent No. 42 01 214, the mounting device according to the invention alone already has the advantage of permitting the distance sensor to be adjusted in the horizontal and in the vertical direction.

The features that, in the installed state of the distance sensor, the screws are able to be screwed from its front side, and that screw-out protection is provided for at least two of the screws, permit adjustment which is easy and reliable, above all even with respect to operator errors. For example, without screw-out protection, it is impossible to rule out in a fail-safe manner that the distance sensor will not fall off from the motor vehicle during an adjustment operation because the screws have been unscrewed too far.

BRIEF DESCRIPTION OF THE DRAWINGS

FIG. 3 shows a second side view of the device shown FIG. 1.

FIG. 4 shows a top view of a distance sensor with a mounting device according to the present invention.

FIG. 6b shows a perspective view of the screw-out protection of FIG. 6a.

DETAILED DESCRIPTION

Figure 1:
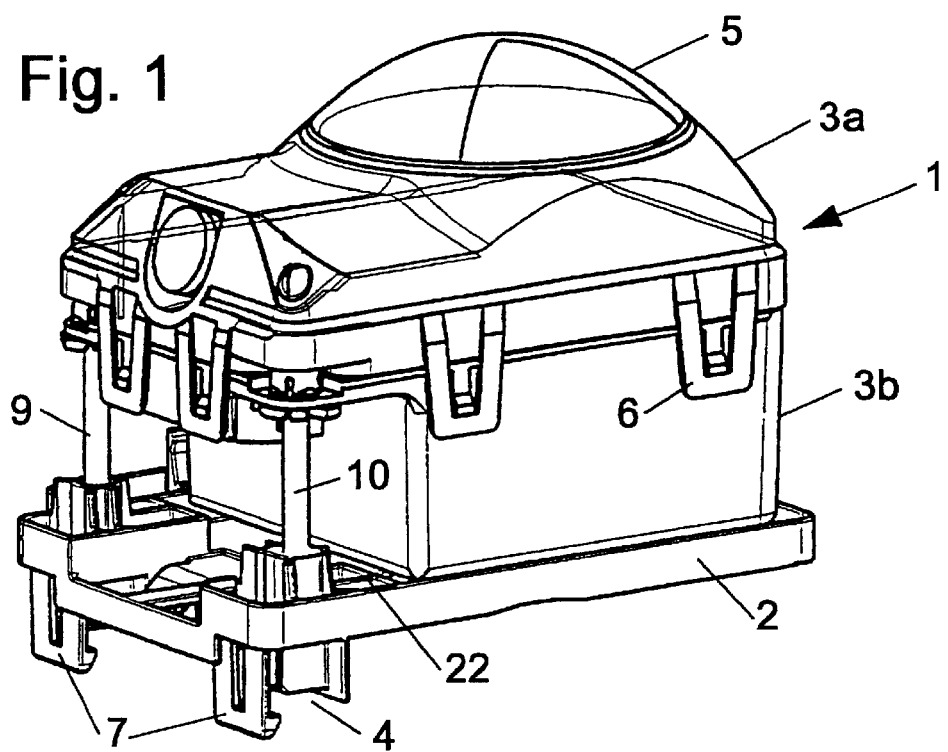
FIG. 1 shows a perspective view of an exemplary embodiment of a device according to the present invention.
Figure 2:
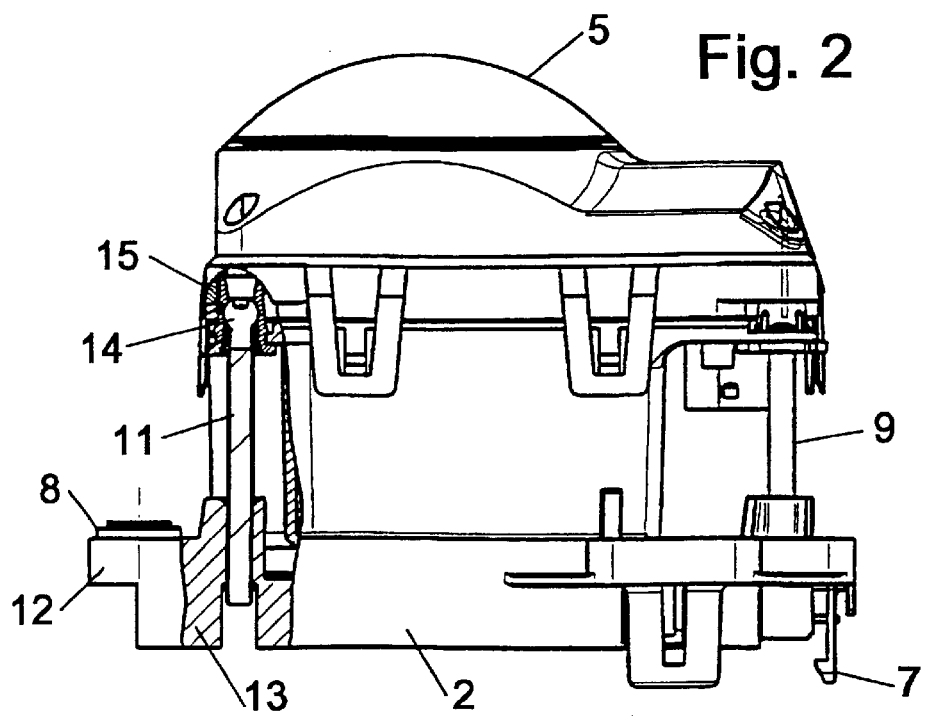
FIG. 2 shows a first side view of the device shown in FIG. 1.

FIG. 1, in a perspective representation, and FIGS. 2 through 4, in various side views, show a distance sensor 1 with a device according to the present invention for mounting on a motor vehicle. Distance sensor 1 is accommodated in a compact housing 3, which here is composed of a lower housing part 3b and an upper housing part 3a. The two housing parts 3a and 3b are joined to each other by clip connections 6. Provided in upper housing part 3a is a lens 5 for focusing the utilized measuring beams of the distance sensor. (This described construction of distance sensor 1, especially the bipartition of the housing shown, is, however, independent of the present invention and can also be designed differently.

Housing 3 of distance sensor 1 is secured to a support 2 by screws 9, 10, 11. On its side facing away from distance sensor 1, support 2 has catching or locking elements 7 with which it snaps into correspondingly shaped accommodations on the body of a motor vehicle. In this exemplary embodiment, these catching elements 7 are provided on one longitudinal side and one transverse side of support 2. On its second transverse side, support 2 has a protuberance 8 which is provided with a bore hole 23 (FIG. 4). As FIG. 2 shows, protuberance 8 forms a limit stop 12, with which protuberance 8 abuts against a corresponding body part of the motor vehicle.

In addition to catch hooks 7, support 2 can be screwed to the body of the motor vehicle through bore hole 23 of protuberance 8. When applying the mounting device to different motor vehicles, catch hooks 7 and protuberance 8 can be redesigned, if applicable. They form, as it were, an adapter for various types of motor vehicles. Preferably, support 2 is always designed in the same manner on its side facing distance sensor 1. On this side, distance sensor 1 is screwed on using screws 9, 10, 11. Screws 9, 10, 11 engage in screw-in areas 13 of support 2. This is shown in FIG. 2, using screw 111 as an example, and ensures simple and fast assembly during large-scale production.

As can also be seen from FIG. 2, screw 11, as well as the other screws 9, 10, has a spherical screw head 14, which is supported in a correspondingly shaped accommodation 15 of housing 3. Accommodation 15 can also be produced as an independent accommodation element which is clipped into the housing of the distance sensor. Because of spherical screw head 14 and correspondingly shaped accommodation 15, housing 3 is moveable with respect to each of screws 9, 10, 11, and thus with respect to the entire support 2. As FIG. 4 shows, because of their L-shaped arrangement, screws 9, 10, 1I form a three-point bearing arrangement. Screws 10 and 11 form two moveable bearings, and screw 9 forms a fixed bearing.

For example, screwing screw 11 deeper into corresponding screw-in area 13 causes the distance sensor to tilt with respect to support 2 about an axis which is formed through the suspension points of the distance sensor at screws 9 and 10. To permit this movement of housing 3, the screw heads have the spherical construction 14 already indicated. Unscrewing screw 11 causes the distance sensor to tilt about the same axis in the reverse direction. Screwing screw 10 in and out causes distance sensor 1 to tilt with respect to support 2 in the orthogonal direction about an axis which runs through suspension points 9 and 11. Thus, the mounting device of the present invention offers the possibility of adjusting distance sensor 1 or its housing 3 in two directions that are vertical relative to each other. Nevertheless, distance sensor 1 is always securely connected to a body part of the motor vehicle via support 2.

As an alternative to the exemplary embodiment described here, in which screw heads 14 are spherical, the screw ends could instead be supported spherically and moveably in a corresponding accommodation. In this case, the respective screw head must be securely joined to housing 3. On the other hand, however, the embodiment described here has the advantage that during an adjustment of the distance sensor, the screws themselves are not tilted at the same time, and therefore a moment of force or rotation, and thus also the effect of wear in the accommodation is less. In addition, the screw-out protection can thus be implemented in a simple manner at the screw end.

Screws 9, 10, 11, are advantageously provided with self-cutting threads. In contrast, screw-in areas 13 are nearly or completely threadless before a screw is screwed in for the first time. This ensures that screwed-in screws 9, 10, 11, and thus distance sensor 1, are always joined to support 2, free from play, even given large-scale production.

Furthermore, the movement path of the distance sensor with respect to support 2 is restricted. For example, in the exemplary embodiment presented here, distance sensor 1 can be tilted in each direction by ±3°. When screws 10 or 11 are screwed in, i.e. when housing 3 is tilted in the direction of support 2, the movement path is restricted by limit-stop locations 22 provided in the surface area of support 2. Thus, the adjustment possibility of distance sensor 1 relative to support 2 is also restricted in this direction.

To prevent the distance sensor from falling off because screws 9,10, 11 are unscrewed too far, according to the present invention, provision is made for screw-out protections 4 for at least two of screws 9,10,11, in particular for screws 10 and 11. These screw-out protections 4 prevent screws 10, 11 from being able to be completely unscrewed from screw-in area 13 of support 2.

Figure 5:
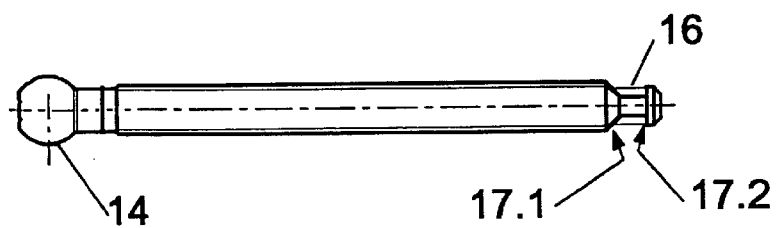
FIG. 5 shows a screw as it is used in the exemplary embodiment of the mounting device according to the present invention.
Figure 6A:
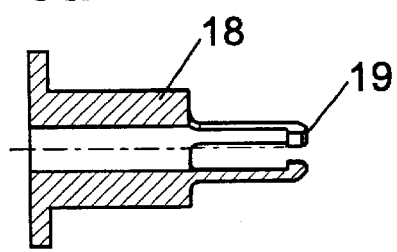
FIG. 6a shows an exemplary embodiment of a screw-out protection.
Figure 6B:
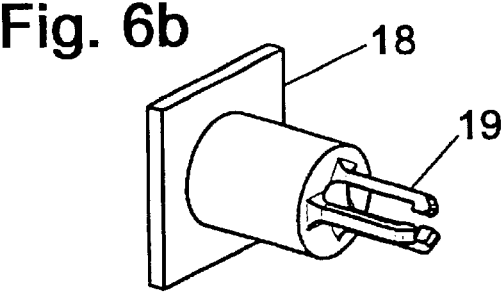

FIG. 5 shows a preferred exemplary embodiment of screws 10 and 11. Spherical head 14 is visible. At the opposite end, the screw has a groove 16 which has a hard limit stop 17.2 on the side facing the screw end, and on the side facing the screw head, has a gentle, i.e. less steep limit stop 17.1. FIGS. 6a and 6b show exemplary embodiments of possible screw-out protections 4. FIGS. 6a and 6b show a screw-out protection 18 which has a cylindrical penetration, at whose end are arranged three catching elements 19 in the form of catch hooks. The screw according to FIG. 5 is guided through the cylindrical penetration of screw-out protection 18, until catch hooks 19 engage in groove 16. Due to hard limit stop 17.2 at the end of the screw, non-destructive unscrewing from screw-out protection 18 is no longer possible. However, because of gentle limit stop 17.1, it is possible to screw the screw in further at any time. In so doing, catch hooks 19 are spread in such a way that the screw passes through. Catch hooks 19, as well as the entire screw-out protection, is preferably manufactured as a plastic injection molded part, the elasticity of the plastic being so selected that catch hooks 19 are not broken off or bent over when screwing in a screw according to FIG. 5.

Figure 7:
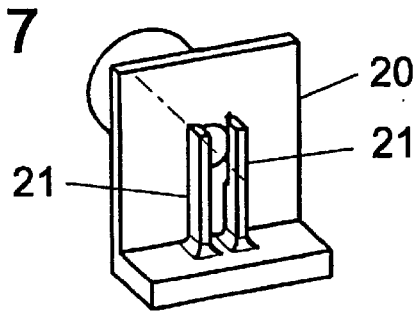
FIG. 7 shows another exemplary embodiment of a screw-out protection.

FIG. 7 shows an alternative exemplary embodiment of screw-out protection 20. Instead of axially arranged catching elements 19, it has two springs 21 arranged radially with respect to the screwed-in screw. The functioning method of the springs corresponds to that in the specific embodiment according to FIGS. 6a and 6b.

As an alternative to groove 16 described above, the screws can also be flattened in the shape of a plate at their end. This can be achieved, for example, by beating the screw ends flat with a stamper, so that they have a bulge-like enlargement at their end. Another possibility is in each case to clip a spring washer into the screw ends after they are screwed in. In both cases, the screw ends thus have an abruptly enlarged diameter which prevents the screw from completely screwing out of screw-in areas 13. An advantage of this alternative is that in this case, even catch hooks 19 can be eliminated.

It is particularly advantageous if support 2 is completely formed from plastic. On the one hand, this permits support 2 to be completely produced as a cost-effective, injection-molded part, and on the other hand, ensures that no corrosion problems can occur. Screw-out protections 4 shown are advantageously injection-molded at the same time with support 2.

Another advantage of the exemplary embodiment shown here is that screws 9,10, 11 are accessible and can be screwed from the front side of the distance sensor.

What is claimed is:

1. A device for mounting a distance sensor to a motor vehicle, the distance sensor being accommodated in a closed housing, the distance sensor having a front side, the front side being a side of the distance sensor where a measuring beam of the distance sensor emerges from the distance sensor, comprising:

a support attachable in an immoveable manner to the motor vehicle;

at least three screws arranged approximately in an L-shape relative to each other, wherein the at least three screws are movably attaching the closed housing to the support when the distance sensor is mounted to the device, wherein the at least three screws are screwed from the front side of the distance sensor when the distance sensor is mounted to the device; and a screw-out protection protecting at least two screws of the at least three screws.

2. The device according to claim 1, wherein the distance sensor includes a proximity radar device.

3. The device according to claim 1, wherein the at least three screws have self-cutting threads, the support having screw-in areas which are substantially threadless before one of the at least three screws is screwed in for a first time.

4. The device according to claim 1, wherein each of the at least three screws has a spherical screw head.

5. The device according to claim 1, wherein the at least two screws have a groove, catching elements of the screw-out protection being engaged in the groove.

6. The device according to claim 5, wherein the groove has a first side and a second side, the groove being bounded on the first side by a first steep limit stop and on a second side by a second steep limit stop, the first steep limit stop being smaller than the second steep limit stop.

7. The device according to claim 1, wherein the at least two screws have at least one of a plate-like flattening and a bulge-like enlargement at an end of the at least two screws.

8. The device according to claim 1, further comprising:

at least one spring washer clipped into a corresponding end of each of the at least two screws.

9. The device according to claim 1, wherein the support is composed of a plastic material.

10. The device according to claim 1, wherein the support has at least one limit-stop location, the at least one limit-stop location restricting an ability of the distance sensor to move in at least one direction when the distance sensor is attached to the support.

* * * * *